United States Patent
Hosokawa

(10) Patent No.: US 8,275,237 B2
(45) Date of Patent: Sep. 25, 2012

(54) MOVING IMAGE REPRODUCING APPARATUS

(75) Inventor: Shuichi Hosokawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1016 days.

(21) Appl. No.: 12/199,371

(22) Filed: Aug. 27, 2008

(65) Prior Publication Data

US 2009/0060448 A1    Mar. 5, 2009

(30) Foreign Application Priority Data

Aug. 30, 2007 (JP) ................................. 2007-224276
Jun. 6, 2008 (JP) ................................. 2008-149806

(51) Int. Cl.
*H04N 9/80* (2006.01)
(52) U.S. Cl. ......... 386/239; 386/241; 386/353; 386/357
(58) Field of Classification Search ............... 386/239, 386/241, 278–284, 353–357
See application file for complete search history.

(56) References Cited

U.S. PATENT DOCUMENTS

| | | | | |
|---|---|---|---|---|
| 7,116,711 B2 * | 10/2006 | Suzuki | ...................... | 375/240.01 |
| 7,302,169 B2 * | 11/2007 | Ihara | ............................. | 386/241 |
| 7,496,274 B2 * | 2/2009 | Chiba | ............................. | 386/326 |
| 7,751,686 B2 * | 7/2010 | Morimoto et al. | ............. | 386/343 |
| 2002/0037151 A1 * | 3/2002 | Goto et al. | ....................... | 386/46 |
| 2005/0147383 A1 | 7/2005 | Ihara | | |

FOREIGN PATENT DOCUMENTS

| | | |
|---|---|---|
| CN | 1259736 A | 7/2000 |
| JP | 07-255030 A | 10/1995 |
| JP | 10-341412 A | 12/1998 |
| JP | 11-289546 | 10/1999 |
| JP | 2001-036844 A | 2/2001 |
| JP | 2002-176626 A | 6/2002 |
| JP | 2002-185920 A | 6/2002 |
| JP | 2002-252832 | 9/2002 |
| JP | 2004-194215 A | 7/2004 |

* cited by examiner

*Primary Examiner* — Ashok Patel
*Assistant Examiner* — Daniel Potratz
(74) *Attorney, Agent, or Firm* — Canon USA Inc. IP Division

(57) ABSTRACT

A reproducing apparatus configured to reproduce moving image data based on management information including time information and position information about a plurality of intra pictures in the moving image data and display the reproduced moving image data on a display includes a determination unit configured to acquire information about a time interval and a position interval between two intra pictures from the time information and the position information and determine a bit rate between the two intra pictures, and a display control unit configured to display information concerning the bit rate determined by the determination unit, on the display.

16 Claims, 11 Drawing Sheets

FIG.3

[MOVING IMAGE DATA (n) I PICTURE INFORMATION]

| | |
|---|---|
| $TSN_0$ | $PTS_0$ |
| $TSN_1$ | $PTS_1$ |
| $TSN_2$ | $PTS_2$ |
| | |
| $TSN_{(n-3)}$ | $PTS_{(n-3)}$ |
| $TSN_{(n-2)}$ | $PTS_{(n-2)}$ |
| $TSN_{(n-1)}$ | $PTS_{(n-1)}$ |

⇩

[BIT RATE TABLE]

| | |
|---|---|
| $TSN_0 \sim TSN_1$ | $Bitrate_0$ |
| $TSN_1 \sim TSN_2$ | $Bitrate_1$ |
| $TSN_2 \sim TSN_3$ | $Bitrate_2$ |
| | |
| $TSN_{(n-3)} \sim TSN_{(n-2)}$ | $Bitrate_{(n-3)}$ |
| $TSN_{(n-2)} \sim TSN_{(n-1)}$ | $Bitrate_{(n-2)}$ |
| $TSN_{(n-1)} \sim$ TERMINAL | $Bitrate_{(n-1)}$ |

FIG.6

| MaxBitRate | OSD |
|---|---|
| 12 Mbps ~ | XP |
| 5 Mbps ~ 12 Mbps | SP |
| ~ 5 Mbps | LP |

MOVING IMAGE REPRODUCING APPARATUS

BACKGROUND OF THE INVENTION

1. Field of the Invention

The present invention relates to a reproducing apparatus configured to reproduce a moving image and, more particularly, to a technique used for displaying a bit rate and a recording mode of moving image data.

2. Description of the Related Art

A moving image taken by a digital video camera is recorded with a recording mode selected from a plurality of recording modes such as XP, SP, and LP modes. An upper limit of a bit rate of data used in recording the moving image is determined by the recording mode. Generally, information about the recording mode is displayed together with the moving image when the moving image is reproduced. Since the display of the recording mode is based on information which is stored in stream data by a manufacturer's unique system or form when the moving image is taken, compatibility between manufacturers is not ensured. Under such circumstances, a method has been developed by which a bit rate of record data is acquired and an applicable recording mode is calculated by a reproducing apparatus even when a manufacturer of a recording apparatus that generated the record data and a manufacturer of the reproducing apparatus that reproduces the record data are different. Japanese Patent Application Laid-Open No. 2002-252832 and Japanese Patent Application Laid-Open No. 11-289546 discuss methods for acquiring a bit rate of record data.

However, if the bit rate of the record data is a variable bit rate, a highest bit rate in an entire record data needs to be acquired in order to obtain a recording mode for determining an upper limit of the bit rate at recording. In acquiring a bit rate from record data which contains a variable bit rate when using the methods discussed in Japanese Patent Application Laid-Open No. 2002-252832 and Japanese Patent Application Laid-Open No. 11-289546, the entire record data has to be demultiplexed. Thus, it takes much time to analyze the data and a considerable amount of time is required before a bit rate and the recording mode are displayed.

SUMMARY OF THE INVENTION

The present invention is directed to a technique which can easily acquire information about a bit rate and a recording mode from record data of a moving image which includes a variable bit rate.

According to an aspect of the present invention, a reproducing apparatus configured to reproduce moving image data based on management information including time information and position information about a plurality of intra pictures in the moving image data and display the reproduced moving image data on a display includes a determination unit configured to acquire information about a time interval and a position interval between two intra pictures from the time information and the position information and determine a bit rate between the two intra pictures and a display control unit configured to display information concerning the bit rate determined by the determination unit on the display.

According to another aspect of the present invention, a method for controlling a reproducing apparatus configured to reproduce moving image data based on management information including time information and position information about a plurality of intra pictures in the moving image data and display the reproduced moving image data on a display includes acquiring information about a time interval and a position interval between two intra pictures from the time information and the position information, determining a bit rate between the two intra pictures, and displaying information concerning the determined bit rate on the display.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 illustrates an example of a bit rate table according to the first exemplary embodiment of the present invention.

FIG. 6 illustrates an example of a relation between the maximum bit rate and a recording mode which is displayed using an on-screen display (OSD) function according to a third exemplary embodiment of the present invention.

DETAILED DESCRIPTION OF THE EMBODIMENTS

Various exemplary embodiments, features, and aspects of the invention will be described in detail below with reference to the drawings.

First Exemplary Embodiment

Figure 1:
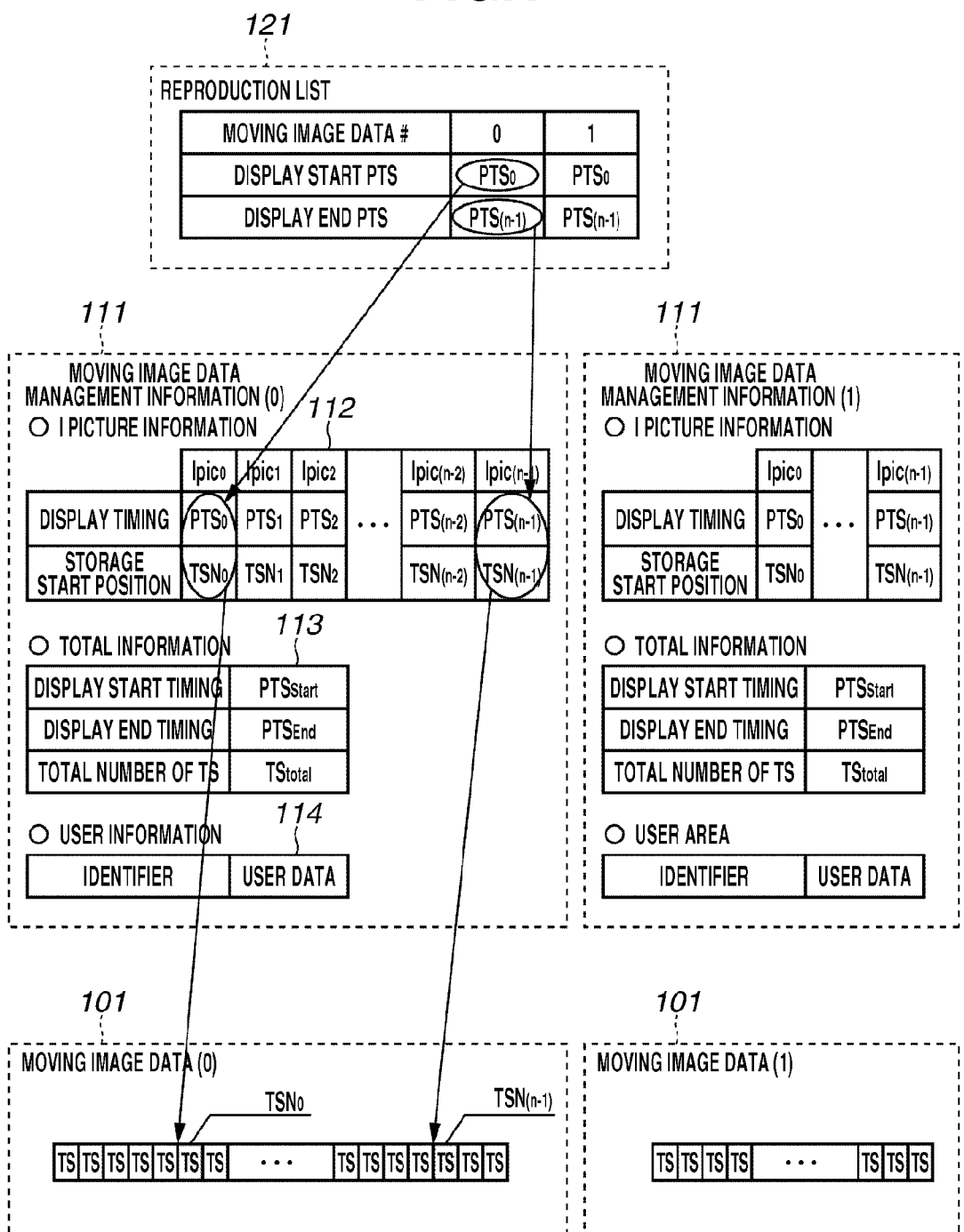
FIG. 1 illustrates an example of a recording format of moving image data reproduced by a reproducing apparatus according to a first exemplary embodiment of the present invention.

FIG. 1 illustrates an example of a recording format of moving image data reproduced by a reproducing apparatus according to a first exemplary embodiment of the present invention. The recording format is composed of three types of data, a reproduction list, moving image data management information, and moving image data.

The moving image data (n) 101 is data of moving image which is coded according to the H.264/MPEG4-AVC standard and then multiplexed into transport streams (TS). Moving image data management information (n) 111 includes I picture information 112, total information 113, and user information 114 of the moving image data (n) 101 which are paired.

The I picture information 112 includes information about a presentation time stamp (PTS) which is timing information about each I picture in the moving image data (n) 101. The I picture information 112 includes information about a storage start packet number (i.e., a transport stream number (TSN)) of I pictures which indicates storage start position information of each I picture in the moving image data (n) 101. The total information 113 includes information about "PTSstart" which is a display start timing of the entire moving image data (n) 101, "PTSend" which is display end timing of the entire moving image data (n) 101, and "TStotal" which is a total number of TS in the moving image data (n) 101. The I picture information 112 can be acquired from the I pictures in a coded state without decoding the images.

The user information 114 includes information provided by a recording apparatus, such as bit rate information and recording mode information (XP, SP, or LP mode) which are obtained when the moving image data is taken. If the reproducing apparatus is the same apparatus that generated the moving image data or if the recording apparatus and the reproducing apparatus are manufactured by the same manufacturer, the bit rate information and the recording mode information can be read from the user information 114. Further, information about a number of the moving image to be reproduced, a display start PTS and a display end PTS of reproduction of each moving image data is included in a reproduction list 121.

Figure 2:
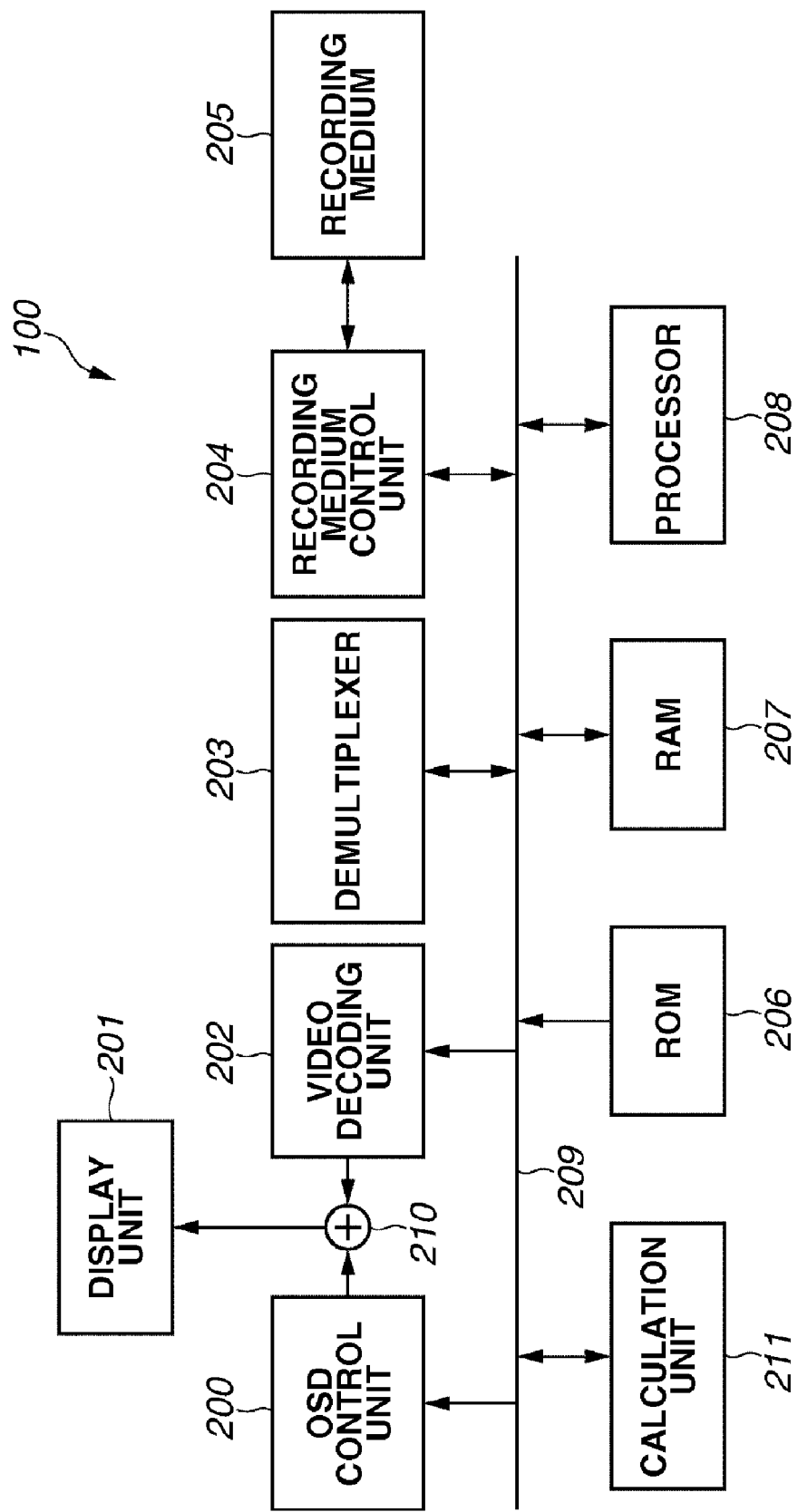
FIG. 2 is a block diagram illustrating an example of a configuration of the reproducing apparatus according to the first exemplary embodiment of the present invention.

FIG. 2 is a block diagram illustrating an example of a configuration of the reproducing apparatus according to the present exemplary embodiment.

In FIG. 2, a reproducing apparatus 100 includes an OSD control unit 200, a display unit 201, a video decoding unit 202, and a demultiplexer 203. Further, the reproducing apparatus 100 includes a recording medium control unit 204, a read-only memory (ROM) 206, a random access memory (RAM) 207, a processor 208, a bus 209, an adder 210, and a calculation unit 211. In addition, a recording medium 205 is loaded into the reproducing apparatus 100.

Information about stream data which is being reproduced is superimposed with the TS by the adder 210 and output to a display unit 201 by the OSD control unit 200. The display unit 201 is, for example, a liquid crystal monitor having the OSD function and displays data to which sign and text information output by the OSD control unit 200 and video data output by the video decoding unit 202 are added by the adder 210.

The video decoding unit 202 is an H.264/MPEG-AVC decoder. The video decoding unit 202 decodes an H.264/MPEG4-AVC elementary stream (ES) which is stored in the RAM 207 and outputs the decoded ES to the adder 210. The demultiplexer 203 divides the TS stored in the RAM 207 into packets of a packetized elementary stream (PES), takes out an ES, and outputs the ES to the RAM 207.

The recording medium control unit 204 acquires data from the recording medium 205 and outputs the data to the RAM 207. The recording medium 205 is a recording medium such as a hard disk, an optical disk, or a magneto-optical disk. The ROM 206 stores a program which is executed by the processor 208. The RAM 207 temporarily stores the TS, the H.264/MPEG4-AVC ES (the moving image data (n) 101), the moving image data management information (n) 111, and the reproduction list 121. Further, the RAM 207 is used as a work memory of the program that is executed by the processor 208. The processor 208 controls the entire system based on the program stored in the ROM 206. The bus 209 connects each block in the system.

The calculation unit 211 determines the bit rate by calculation based on the moving image data management information (n) 111 stored in the RAM 207 and sends the bit rate information to the OSD control unit 200.

Figure 9:
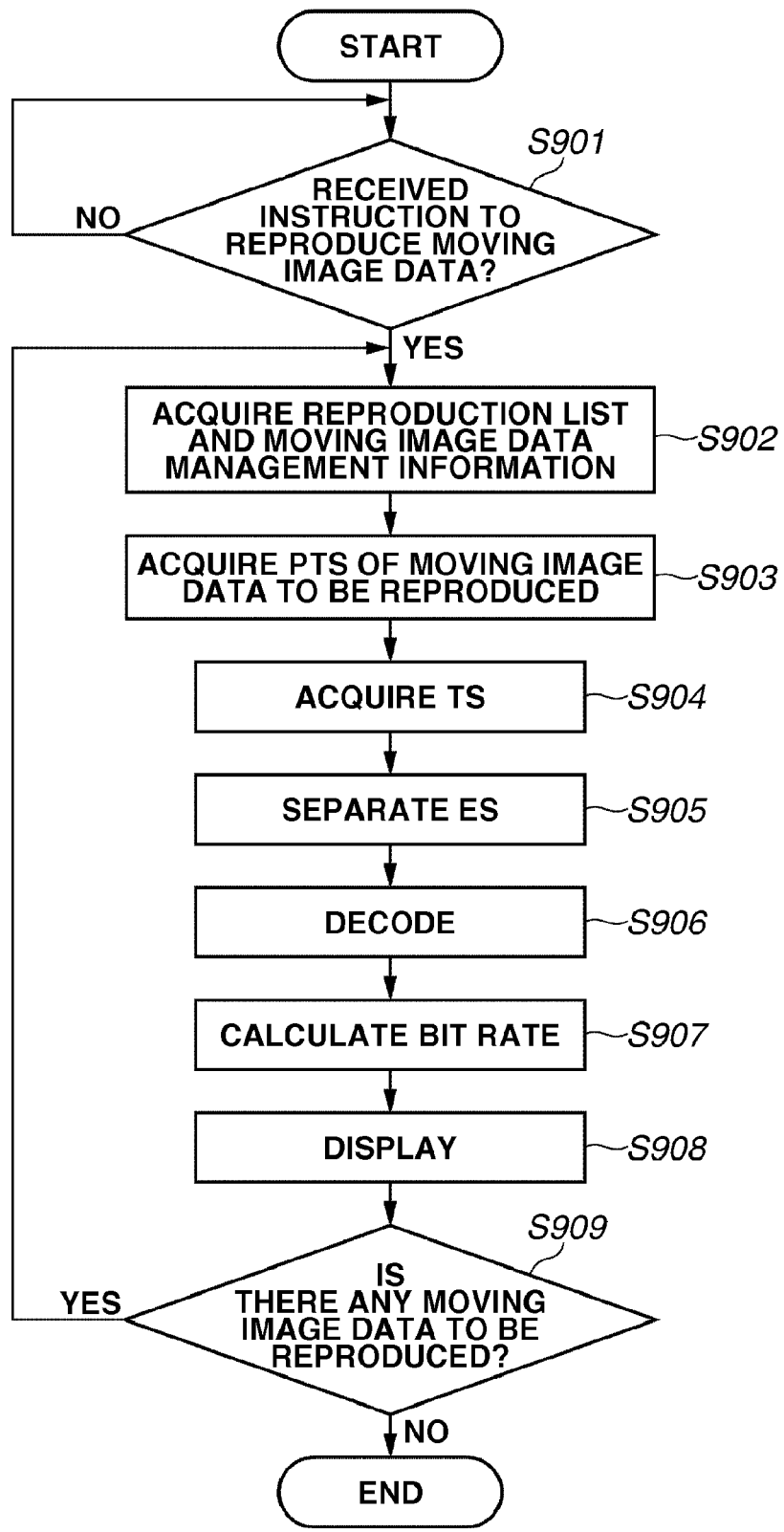
FIG. 9 is a flowchart illustrating an example of processing procedures for acquiring and displaying bit rate information according to the first exemplary embodiment of the present invention.

FIG. 9 is a flowchart illustrating an example of processing procedures for reproducing the moving image data and displaying the bit rate. Each of the processes illustrated in FIG. 9 is controlled by the processor 208.

In step S901, the processor 208 determines whether an instruction for reproduction is given from a user interface (not shown). If the instruction for reproduction is not given (NO in step S901), the processor 208 waits until the instruction is given.

If the processor 208 receives the instruction (YES in step S901), then in step S902, the processor 208 drives the recording medium control unit 204 to read the reproduction list 121 and the moving image data management information of the moving image data to be reproduced from the recording medium 205. The reproduction list 121 and the moving image data management information are stored in the RAM 207 and analyzed by the processor 208.

In step S903, the processor 208 selects the moving image data to be reproduced from the reproduction list 121 and acquires PTS (0) which is the display start PTS and PTS (n−1) which is the display end PTS. If a plurality of pieces of moving image data to be reproduced exists, the processor 208 acquires the PTS (0) and the PTS (n−1) in an order in which the plurality of pieces of moving image data is registered in the reproduction list 121.

In step S904, the processor 208 acquires information about the TSN (0) and the TSN (n−1) which respectively indicates the I picture storage start position corresponding to the PTS (0) and the PTS (n−1) using one piece of the moving image data management information. Similarly, the processor 208 reads the TS corresponding to TSN (0) through TSN (n−1) of the moving image data in a TS format from the recording medium 205 and temporarily stores the TS in the RAM 207.

In step S905, the processor 208 divides the TS which is temporarily stored in the RAM 207 into the PES packets using the demultiplexer 203 to separate the ES. Then, the processor 208 stores the separated ES in the RAM 207.

In step S906, the video decoding unit 202 decodes the ES based on a decode time stamp (DTS) which is included in the PES packet and outputs the decoded ES to the adder 210. In step S907, the calculation unit 211 determines the bit rate of the TS based on the moving image data management information stored in the RAM 207 using a method described below.

In step S908, the OSD control unit 200 controls the adder 210 to superimpose the bit rate information calculated by the calculation unit 211 on the decoded video data (TS) and outputs the superimposed information on the display unit 201.

In step S909, the processor 208 determines whether the moving image data which is not yet reproduced remains on the reproduction list 121. If moving image data which is not yet reproduced remains (YES in step S909), the process returns to step S902. According to the example illustrated in FIG. 1, after the reproduction of the moving image data (0) ends, the process returns to step S902 to process the next moving image data (1). When all the moving image data is reproduced (NO in step S909), the process ends.

Next, the method for calculating the bit rate of the TS from the moving image data management information by the calculation unit 211 is described referring to FIG. 3. FIG. 3 illustrates an example of a bit rate table according to the present exemplary embodiment. In step S907, the calculation unit 211 calculates the bit rate between a k-th I picture and a (k+1)-th I picture which are registered in the I picture information 112 of the moving image data (n) 101 to create the bit rate table. As an example of a specific determination method based on a calculation of the bit rate, equations below can be used.

$$\text{if } (k < N)\{\text{Bitrate}(k) = ((TSN(k) - TSN(k+1)) * 192 \text{ Byte} * 8\text{bit}) /$$
$$((PTS(k+1) - PTS(k))/90 \text{ kHz})\}$$
$$\text{else } \{\text{Bitrate}(k) = ((TStotal - TSN(k)) * 192 \text{ Byte} * 8\text{bit}) /$$
$$((PTSend) - PTS(k))/90 \text{ kHz})\}$$

Here, a Bitrate (k) represents a calculation result of the bit rate between from the k-th I picture to the (k+1)-th I picture. A TSN (k) represents the storage start packet number of the k-th I picture acquired from the I picture information 112 of the moving image data management information (n) 111. A PTS (k) represents the display start timing (at 90 kHz) of the K-th intra picture acquired from the I picture information 112 of the moving image data management information (n) 111.

The TStotal represents a total number of packets in the moving image data (n) 101 and is acquired from the total information 113 of the moving image data management information (n) 111. The PTSend represents the display end timing (at 90 kHz) of a stream file and is acquired from the total information 113 in the moving image data management information (n) 111. Further, "N" represents a total number of the I pictures in the moving image data (n) 101. As described above, the bit rate is determined using information about a time interval and positional interval between the K-th I picture and the (k+1)-th I picture.

Figure 4:
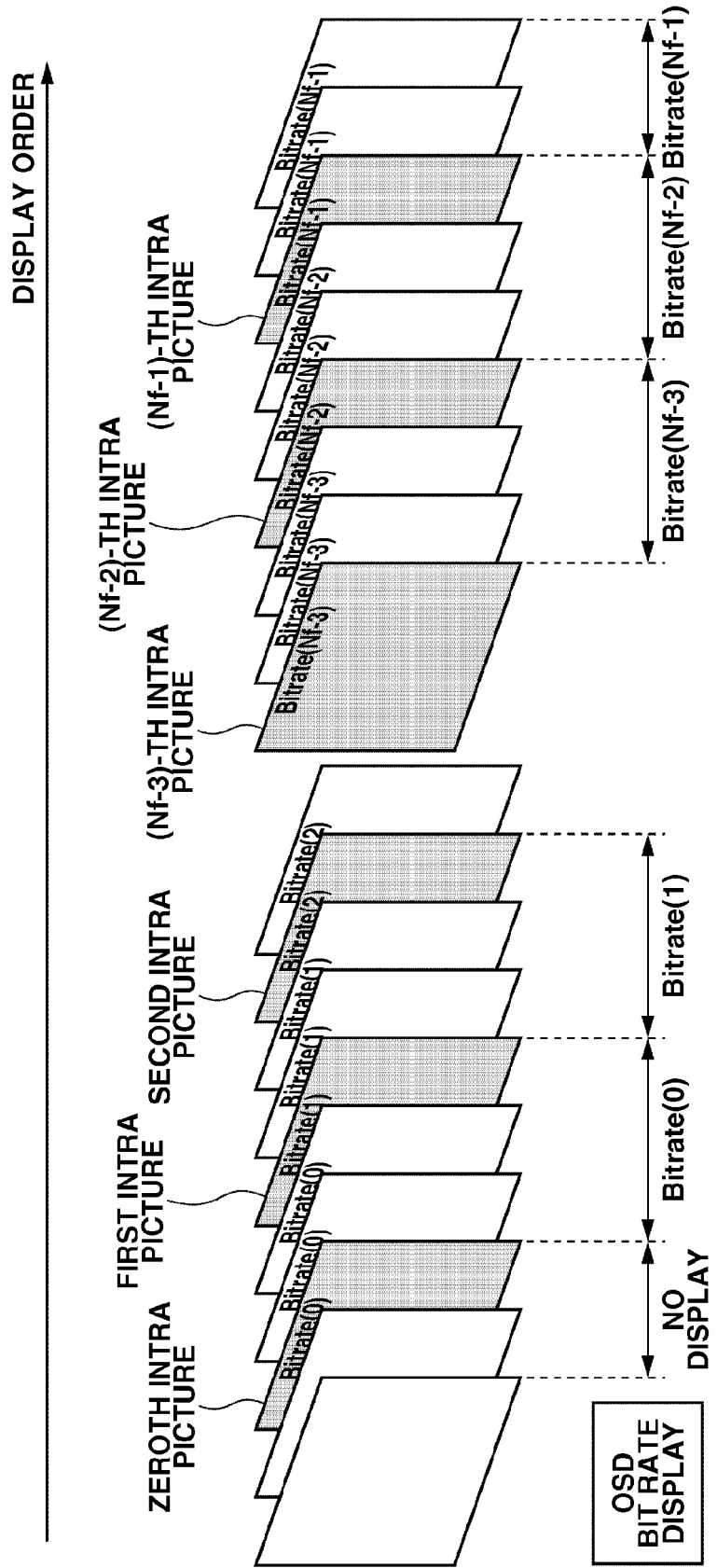
FIG. 4 illustrates timing for displaying a bit rate according to the first exemplary embodiment of the present invention.

FIG. 4 illustrates timing for displaying the bit rate according to the present exemplary embodiment.

As illustrated in FIG. 4, the calculation result Bitrate (k) is displayed from the display start of the K-th I picture to just before the display start of the (k+1)-th I picture on the display unit 201 using the OSD.

According to the present exemplary embodiment the bit rate can be easily acquired without demultiplexing the stream file. Further, the bit rate information can be displayed and notified to a user together with the moving image.

According to the present exemplary embodiment, the bit rates between all the intra pictures are calculated. However, a similar calculation can be performed every m-number of intra pictures. In this case, the display of the bit rates illustrated in FIG. 4 will be changed over every m-number of intra pictures.

Second Exemplary Embodiment

According to the first exemplary embodiment, the bit rates for every intra picture are calculated and the calculation results are displayed. In a second exemplary embodiment, a maximum bit rate of an entire stream, especially, a stream with a variable bit rate (VBR) is calculated and displayed. Descriptions of the system configuration and procedures for creating the bit rate table are omitted as they are similar to those of the first exemplary embodiment.

Figure 5:
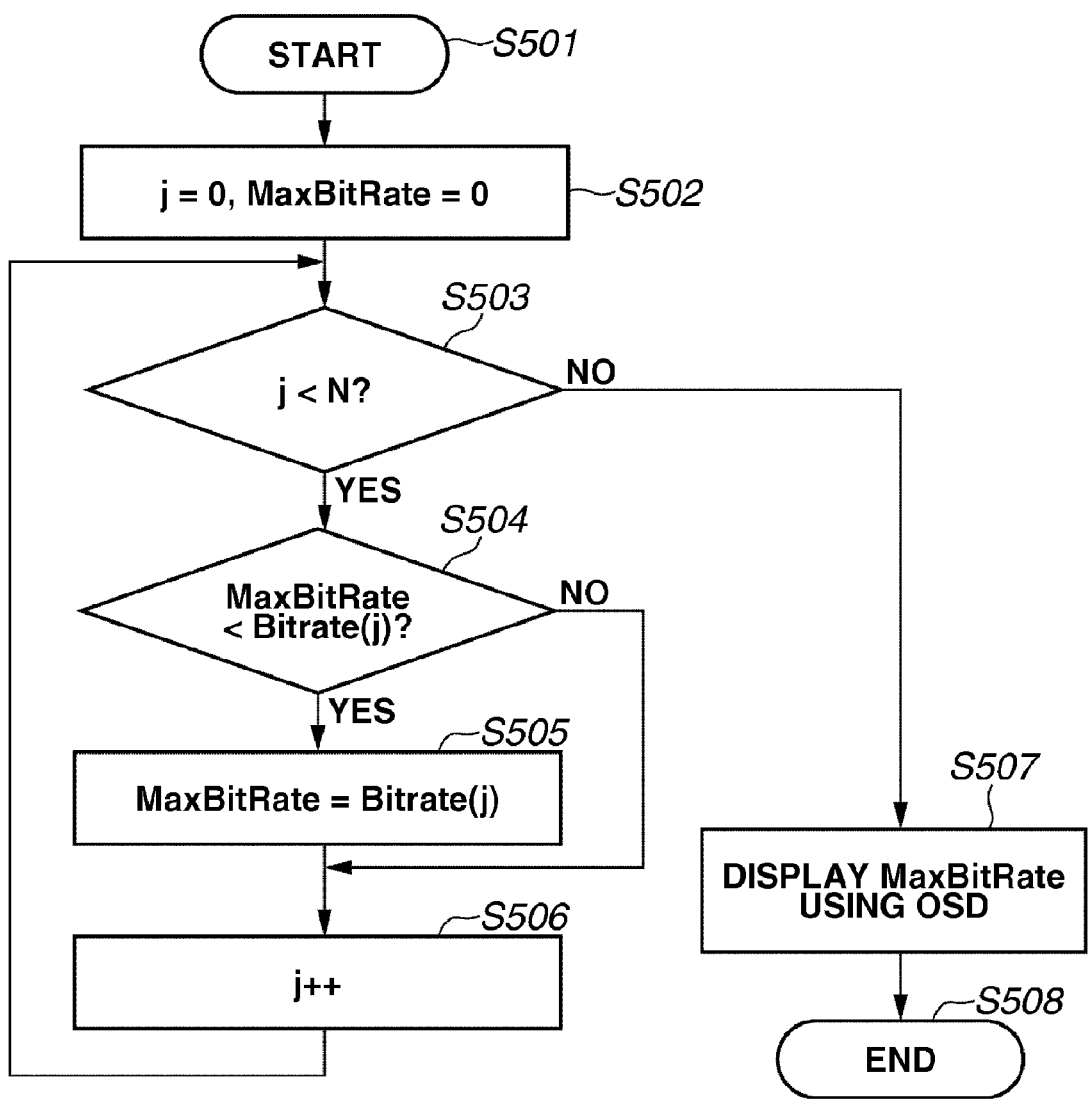
FIG. 5 is a flowchart illustrating an example of processing procedures for calculating a maximum bit rate of a stream file from the bit rate table according to a second exemplary embodiment of the present invention.

FIG. 5 is a flowchart illustrating an example of processing procedures for calculating the maximum bit rate of the stream file using the bit rate table. Each of the processes illustrated in FIG. 5 is controlled by the processor 208.

In step S501, the processor 208 starts the process. In step S502, the processor 208 initializes a variable "j" and a field "MaxBitRate" to 0. The variable "j" represents an end line of the bit rate table. The field "MaxBitRate" is where the obtained maximum bit rate is stored.

Next, the processor 208 repeats processes in steps S503 through S506 to select the maximum bit rate in the bit rate table. In step S503, the processor 208 determines whether the variable j is smaller than the number N illustrated in FIG. 3. If the variable j is smaller than the number N (YES in step S503), the process proceeds to step S504. If the variable j equals the number N (NO in step S503), the process proceeds to step S507.

In step S504, the processor 208 determines whether a Bitrate (j) is greater than the maximum bit rate in a zeroth to a (j−1)-th section of the bit rate table. If the Bitrate (j) is greater than the maximum bit rate (YES in step S504), then in step S505, the processor 208 updates the "MaxBitRate" and the process proceeds to step S506. If the Bitrate (j) equals or smaller than the maximum bit rate (NO in step S504), the process proceeds to step S506.

In step S506, the processor 208 increments the variable j. Then the process returns to step S503. This process is repeated until the end line of the bit rate table. In step S507, the processor 208 displays the bit rate stored in the "MaxBitRate" as the maximum bit rate of the stream file while the stream is being displayed using the OSD. In step S508, the process ends.

According to the present exemplary embodiment, the maximum bit rate can be easily acquired and notified to the user without demultiplexing the stream file even when the stream has VBR.

Third Exemplary Embodiment

In a third exemplary embodiment, a method for calculating and displaying a recording mode (e.g., XP, SP, or LP mode) which determines an upper limit of the bit rate by which a video camera takes and records a stream, based on the maximum bit rate calculated according to the second exemplary embodiment is described. Descriptions of the system configuration and process for acquiring the "MaxBitRate" are omitted as they are similar to those of the second exemplary embodiment.

FIG. 6 illustrates an example of a relation between the maximum bit rate and the recording mode displayed using the OSD according to the present exemplary embodiment.

In FIG. 6, if the bit rate of 12 Mbps or more is acquired as the "MaxBitRate", the "XP" is displayed as the appropriate recording mode using the OSD while the stream is being displayed. Similarly, if the bit rate of 5 Mbps or more but not exceeding 12 Mbps is acquired as the "MaxBitRate", the "SP" is displayed using the OSD while the stream is being displayed. If the bit rate of less than 5 Mbps is acquired as the "MaxBitRate", the "LP" is displayed using the OSD while the stream is being displayed.

According to the present exemplary embodiment, the recording mode which is used for taking the moving image can be easily displayed when the moving image is reproduced using the OSD. Contents to be displayed using the OSD and the relation between the displayed contents and the MaxBitRate are not limited to the example illustrated in FIG. 6. The contents may be displayed in various forms so long as the recording mode can be displayed.

Fourth Exemplary Embodiment

In the first through the third exemplary embodiments, the bit rate is calculated and displayed based on the moving image data management information. According to a fourth exemplary embodiment, the bit rate information can be previously recorded on the moving image data in a multiplex manner. A method for acquiring and displaying the bit rate corresponding to both of a case when the bit rate information is multiplexed and a case when the bit rate information is not multiplexed is described. Generally, the Multiplexed bit rate information can be read when a recording device and a reproducing device are the same device. However, the multiplexed bit rate information cannot be read when a reproducing device and a recording device are different devices. Descriptions of the system configuration are omitted as they are similar to those of the first exemplary embodiment.

A recording bit rate is assigned to the stream file (moving image data) by, for example, storing an identifier and the bit rate in Mbps in a "User_data_unregistered( )" field in an "SEI_message( )" of the moving image data according to the H.264/MPEG4-AVC standard. The identifier indicates that the bit rate is stored in the "User_data_unregistered( )" field.

Figure 7:
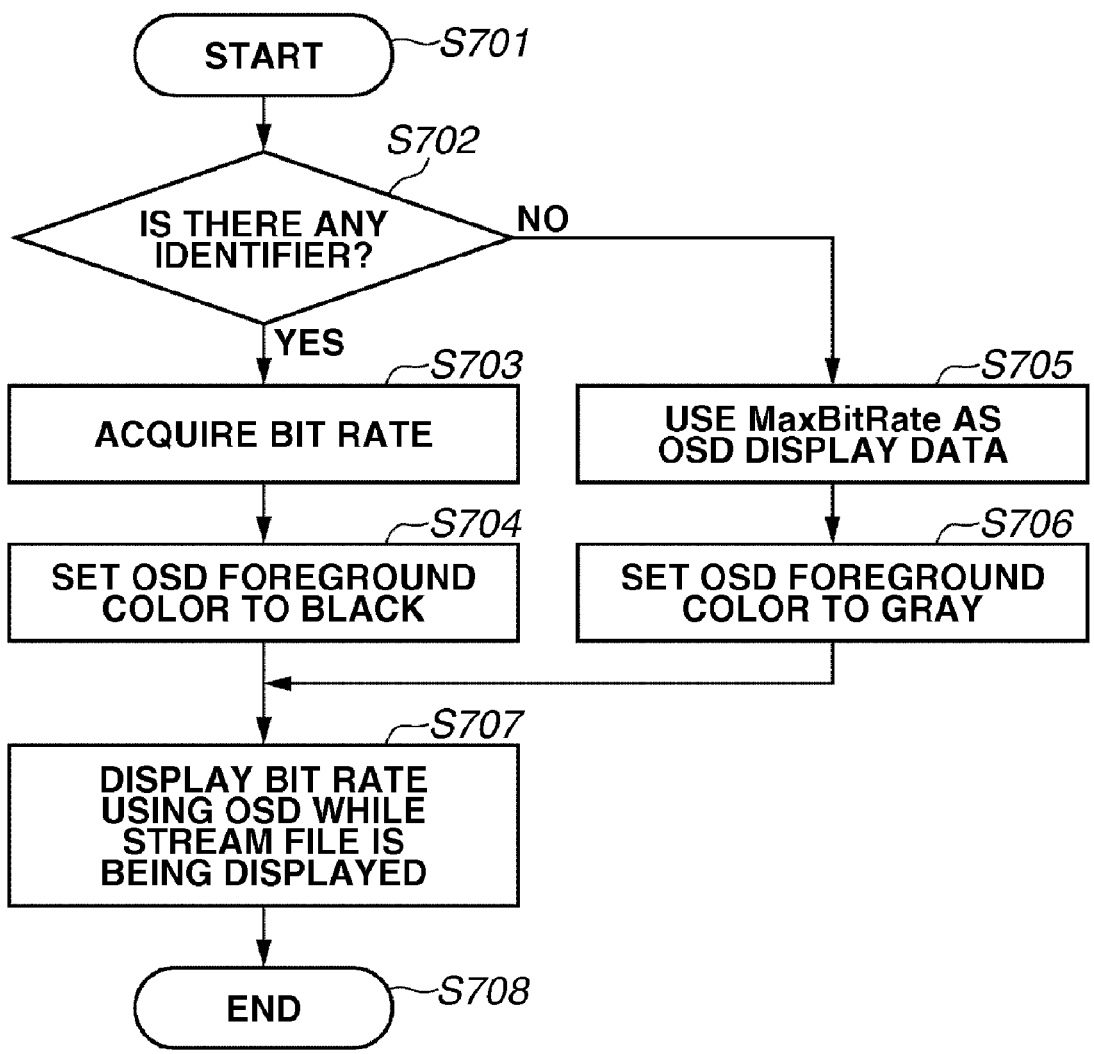
FIG. 7 is a flowchart illustrating an example of processing procedures for acquiring and displaying bit rate information according to a fourth exemplary embodiment of the present invention.

Next, the method for acquiring and displaying the bit rate information is described. FIG. 7 is a flowchart illustrating an example of processing procedures for acquiring and displaying the bit rate information according to the present exemplary embodiment. Each of the processes illustrated in FIG. 7 is controlled by the processor 208.

In step S701, the process starts. In step S702, the processor 208 checks whether the identifier is in the "User_data_unregistered( )" field. If the identifier is in the "User_data_unregistered( )" field (YES in step S702), the process proceeds to step S703. In step S703, the processor 208 acquires the bit rate in Mbps stored in the "User_data_unregistered( )" field and sends the acquired bit rate to the OSD control unit 200. Next, in step S704, the OSD control unit 200 sets a foreground color of the bit rate to black.

If the identifier is not in the "User_data_unregistered( )" field (NO in step S702), then in step S705, the processor 208 acquires the "MaxBitRate" by the procedures similar to those of the second exemplary embodiment and sends the acquired "MaxBitRate" to the OSD control unit 200. In step S706, the OSD control unit 200 sets the foreground color of the bit rate to gray. In step S707, the OSD control unit 200 displays the bit rate in the foreground color determined in step S704 or S706 in accordance with display of the stream using the OSD. In step S708, the process ends.

According to the present exemplary embodiment, the bit rate can be acquired independently of whether the bit rate information is assigned when the moving image is recorded. Further, a display manner of the bit rate can be changed and notified to a user according to a route through which the bit rate is acquired.

According to the present exemplary embodiment, the foreground color of the bit rate is changed according to the route through which the bit rate is acquired. However, a different display manner such as flashing or not flashing the display in the OSD or adding or not adding a frame to the display of the bit rate can be used. Further, according to the present exemplary embodiment, the bit rate is stored in the moving image data, however, the bit rate can be stored, for example, in the user information 114 of the moving image data management information (n) 111.

Fifth Exemplary Embodiment

According to a fifth exemplary embodiment, the recording mode (XP, SP, or LP mode) of the video camera by which moving image data is taken and recorded can be recorded together with the moving image data in a multiplex manner. A display of the recording mode which corresponds to both of a case where the recording mode information is multiplexed and a case where the recording information is not multiplexed is described. Generally, the Multiplexed recording mode information can be read when a recording device and a reproducing device are the same device. However, the multiplexed recording mode information cannot be read when a reproducing device and a recording device are different devices. Descriptions of the system configuration are omitted as they are similar to those of the third exemplary embodiment.

The recording mode is assigned to the stream file (moving image data) by, for example, storing an identifier and the recording mode information (XP, SP, or LP) in the "User_data_unregistered( )" field in the "SEI_message( )" of the moving image data according to the H.264/MPEG4-AVC standard. The identifier indicates that the recording mode is stored in the "User_data_unregistered( )" field.

Figure 8:
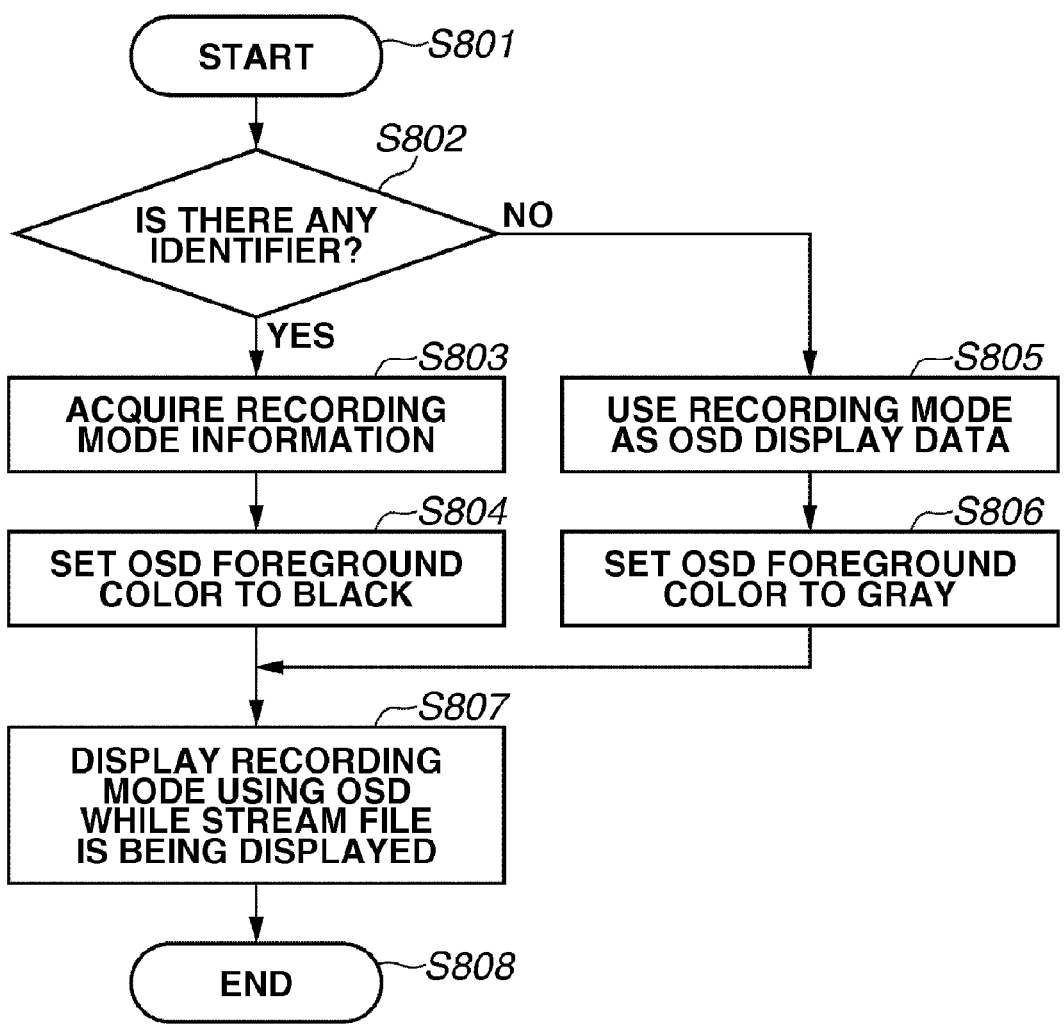
FIG. 8 is a flowchart illustrating an example of processing procedures for acquiring and displaying recording mode information according to a fifth exemplary embodiment of the present invention.

Next, a method for acquiring and displaying the recording mode information is described. FIG. 8 is a flowchart illustrating an example of processing procedures for acquiring and displaying the recording mode information according to the present exemplary embodiment. Each of the processes illustrated in FIG. 8 is controlled by the processor 208.

In step S801, the process starts. In step S802, the processor 208 checks whether the identifier is in the "User_data_unregistered( )" field. If the identifier is in the "User_data_unregistered( )" field (YES in step S802), the process proceeds to step S803. In step S803, the processor 208 acquires the recording mode information (XP, SP, or LP) stored in the "User_data_unregistered( )" field and sends the acquired recording mode information to the OSD control unit 200. Next, in step S804, the OSD control unit 200 determines a foreground color of the recording mode to black.

If the identifier is not in the "User_data_unregistered( )" field (NO in step S802), then in step S805, the processor 208 acquires the recording mode in procedures similar to those of the third exemplary embodiment and sends the acquired recording mode to the OSD control unit 200. In step S806, the OSD control unit 200 sets the foreground color of the recording mode to gray. In step S807, the OSD control unit 200 displays the recording mode in the foreground color determined in step S804 or step S806 together with the stream using the OSD. In step S808, the process ends.

According to the present exemplary embodiment, the recording mode information can be acquired independently of whether the recording mode information is assigned when the moving image is recorded. Further, according to the route through which the recording mode is acquired, a display manner of the recording mode can be changed and notified to a user.

According to the present exemplary embodiment, the foreground color of the recording mode is changed according to the route through which the bit rate is acquired. However, a different display manner such as flashing or not flashing the display in the OSD or adding or not adding a frame to the display the recording mode can be used. Further, according to the present exemplary embodiment, the recording mode information is stored in the moving image data, however, the recording mode information can be stored, for example, in the user information 114 of the moving image data management information (n) 111.

Sixth Exemplary Embodiment

In a sixth exemplary embodiment, a method for acquiring and displaying the bit rate corresponding to both of a case where the bit rate information is multiplexed and a case where the bit rate information is not multiplexed in a reproduction index display is described. According to the present exemplary embodiment, the reproduction index display is an introductory screen for reproducing a stream file using a reduced image. Descriptions of the system configuration are omitted as they are similar to those of the fourth exemplary embodiment.

The recording bit rate is assigned to the stream file (moving image data) by, for example, storing the identifier and the bit rate in Mbps in the "User_data_unregistered( )" field in the "SEI_message( )" of the moving image data according to the H.264/MPEG4-AVC standard. The identifier indicates that the bit rate is stored in the "User_data_unregistered( )" field.

Next, acquiring and displaying of the reduced image (a representative image) and the bit rate information is described. The reduced image for the index display is generated as the representative image data by decoding an intra picture which is arranged at the top of each stream file using the video decoding unit 202 and by reducing and aligning the decoded image by the processor 208 on the RAM 207.

Figure 10:
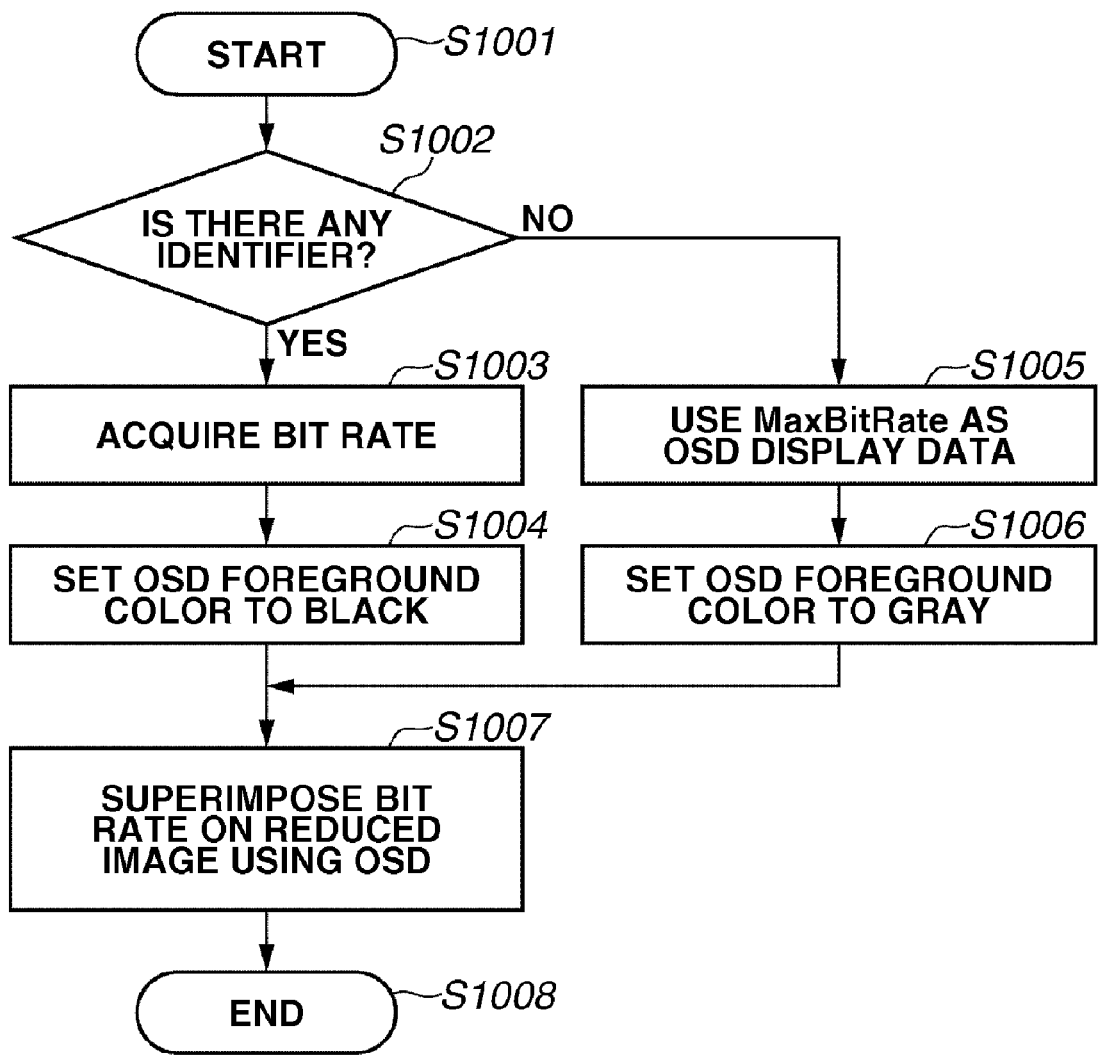
FIG. 10 is a flowchart illustrating an example of processing procedures for acquiring and displaying bit rate information according to a sixth exemplary embodiment of the present invention.

FIG. 10 is a flowchart illustrating an example of processing procedures for acquiring and displaying the bit rate information according to the present exemplary embodiment. Each of the processes illustrated in FIG. 10 is controlled by the processor 208.

In step S1001, the process starts. In step S1002, the processor 208 checks whether the identifier is in the "User_data_unregistered( )" field. If the identifier is in the "User_data_unregistered( )" field (YES in step S1002), the process proceeds to step S1003. In step S1003, the processor 208 acquires the bit rate in Mbps stored in the "User_data_unregistered( )" field and sends the acquired bit rate to the OSD control unit 200. Next, in step S1004, the OSD control unit 200 sets the foreground color of the bit rate to black.

If the identifier is not in the "User_data_unregistered( )" field (NO in step S1002), then in step S1005, the processor 208 acquires the "MaxBitRate" by the procedures similar to those of the second exemplary embodiment and sends the acquired "MaxBitRate" to the OSD control unit 200. In step S1006, the OSD control unit 200 sets the foreground color of the bit rate to gray. In step S1007, the OSD control unit 200 superimposes the bit rate in the foreground color determined in step S1004 or step S1006 on the reduced image of the stream file in the reproduction index display using the OSD. In step S1008, the process ends.

By repeating the processes in steps S1001 through S1008 for a number of times, a reproduction index display screen in which the bit rate information is added to each of a plurality of reduced images of the stream file is generated. The bit rate information can be displayed superimposed on the corresponding representative image or displayed side by side with the corresponding representative image.

According to the present exemplary embodiment, the bit rate can be acquired independently of whether the bit rate information is assigned when the moving image is recorded. Further, the acquired bit rate information can be displayed on the index display which is displayed by the display unit 201. Furthermore, the display manner of the bit rate can be changed and notified to a user according to the route through which the bit rate is acquired.

According to the present exemplary embodiment, the foreground color of the bit rate is changed according to the route through which the bit rate is acquired. However, a different display manner such as flashing or not flashing the display using the OSD or adding or not adding a frame to the display of the bit rate can be used. Further, according to the present exemplary embodiment, the bit rate is stored in the moving image data, however, the bit rate can be stored, for example, in the user information 114 of the moving image data management information (n) 111.

Seventh Exemplary Embodiment

According to a seventh exemplary embodiment, a method for acquiring and displaying the recording mode corresponding to both of a case where the recording mode is multiplexed and a case where the recording mode is not multiplexed in the reproduction index display is described. According to the present exemplary embodiment, the reproduction index display is the introductory screen for reproducing contents using the reduced image. Descriptions of the system configuration are omitted as they are similar to those of the fifth exemplary embodiment.

The recording mode is assigned to the stream file (moving image data) by, for example, storing the identifier and the recording mode information (XP, SP, or LP) in the "User_data_unregistered( )" field in the "SEI_message( )" of the moving image data according to the H.264/MPEG4-AVC standard. The identifier indicates that the recording mode is stored in the "User_data_unregistered( )" field.

Next, acquiring and displaying of the reduced image (representative image) and the recording mode is described. The reduced image for the index display is generated as the representative image data by decoding the intra picture which is arranged at the top of each stream file using the video decoding unit 202 and by reducing and aligning the decoded image with the processor 208 on the RAM.

Figure 11:
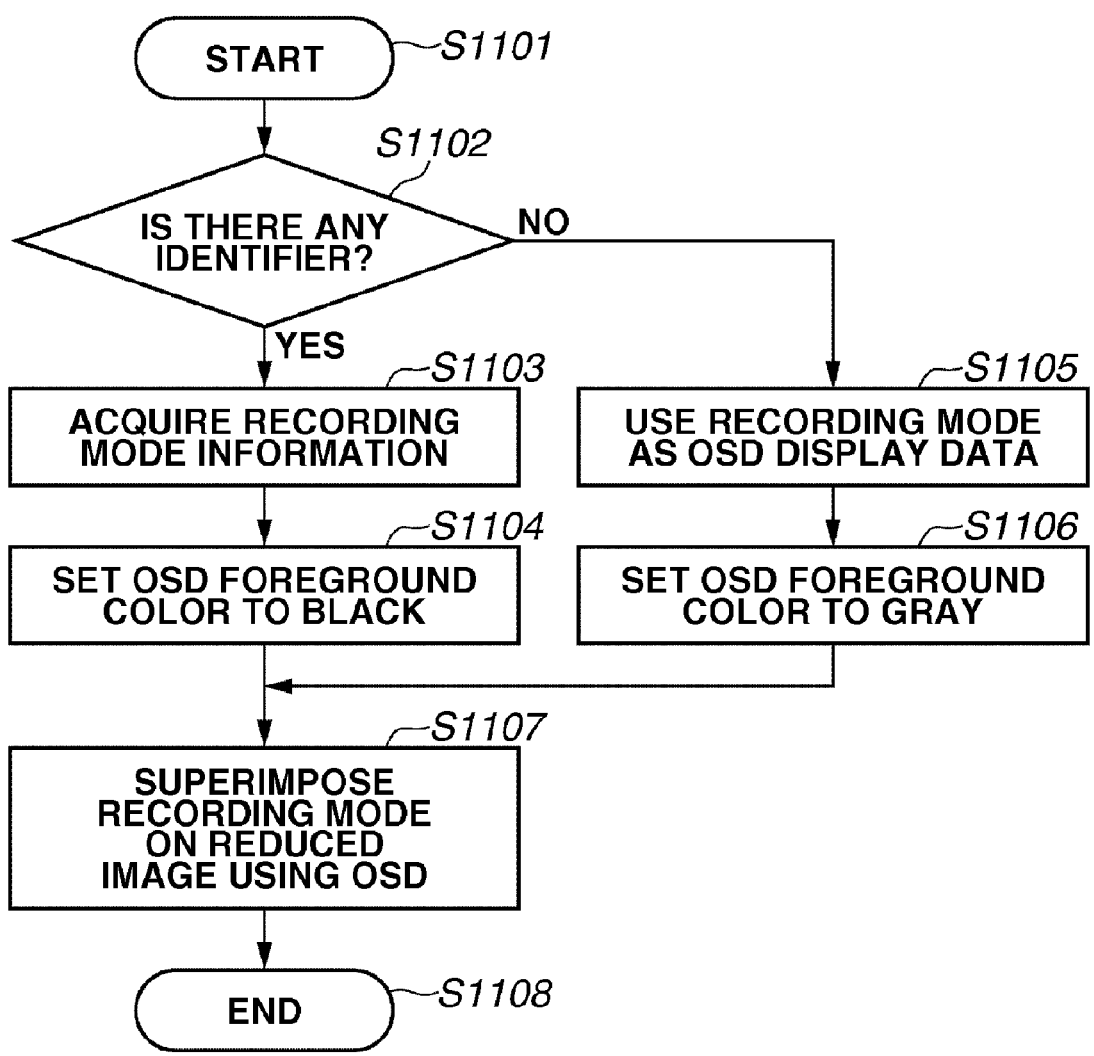
FIG. 11 is a flowchart illustrating an example of processing procedures for acquiring and displaying recording mode information according to a seventh exemplary embodiment of the present invention.

FIG. 11 is a flowchart illustrating an example of processing procedures for acquiring and displaying the recording mode information according to the present exemplary embodiment. Each of the processes illustrated in FIG. 11 is controlled by the processor 208.

In step S1101, the process starts. In step S1102, the processor 208 checks whether the identifier is in the "User_data_unregistered( )" field. If the identifier is in the "User_data_unregistered( )" field (YES in step S1102), the process proceeds to step S1103. In step S1103, the processor 208 acquires the recording mode information XP, SP, or LP stored in the "User_data_unregistered( )" field and sends the acquired recording mode information to the OSD control unit 200. Next, in step S1104, the OSD control unit 200 sets the foreground color of the recording mode to black.

If the identifier is not in the "User_data_unregistered( )" field (NO in step S1102), then in step S1105, the processor 208 acquires the recording mode by the procedures similar to those of the third exemplary embodiment and sends the acquired recording mode to the OSD control unit 200. In step S1106, the OSD control unit 200 sets the foreground color of the recording mode to gray. In step S1107, the OSD control unit 200 superimposes the recording mode in the foreground color determined in step S1104 or step S1106 on the reduced image of the stream file in the reproduction index display using the OSD. In step S1108, the process ends.

By repeating the processes in steps S1101 through S1108 for a number of times, the reproduction index display screen in which the recording mode information is added to each of the plurality of reduced images of the stream file is generated. The recording mode information can be displayed superimposed on the corresponding representative image or displayed side by side with the corresponding representative image.

According to the present exemplary embodiment, the recording mode information can be acquired independently of whether the recording mode information is assigned when the moving image is recorded. Further, the acquired recording mode information can be displayed on the index display of the display unit 201. Furthermore, the display manner of the recording mode can be changed and notified to a user according to the route through which the recording mode is acquired.

According to the present exemplary embodiment, the foreground color of the recording mode is changed according to the route through which the recording mode is acquired. However, different display manner such as flashing or not flashing the display using the OSD or adding or not adding a frame to the display the recording mode can be used. Further, according to the present exemplary embodiment, the recording mode information is stored in the moving image data, however, the recording mode information can be stored, for example, in the user information 114 of the moving image data management information (n) 111.

Other Exemplary Embodiments

Process of the controlling method of each unit that configures the reproducing apparatus and also the reproducing apparatus according to the present invention can be realized by executing a program stored in a RAM or a ROM of a computer. The program and a computer-readable storage medium storing the program are included in the present invention.

The above-described exemplary embodiments can be also realized with, for example, a system, an apparatus, a method, a program, or a storage medium. More specifically, the above-described exemplary embodiments can be applied to a system including a plurality of devices or an apparatus including a single device.

The present invention can be applied to a case where a software program which implements functions of the above-described exemplary embodiments (a program corresponding to the flowcharts illustrated in FIG. 5 and FIGS. 7 to 11 according to the above-described exemplary embodiments) is supplied to a system or an apparatus directly or remotely, and a computer of the system or the apparatus executes the supplied program code to realize the functions of the above-described exemplary embodiments.

Accordingly, the program code which is installed in and executed by the computer to realize the functions of the exemplary embodiments of the present invention also configures the present invention. In other words, the present invention includes a computer-executable program configured to realize the processing of the functions of the above-described exemplary embodiments.

In this case, the computer-executable program can be provided in a form of an object code, a program executed by an interpreter, or script data supplied to an operating system (OS), etc., if it functions as a program.

A recording medium for supplying the program includes, for example, a floppy disk, a hard disk, an optical disk, a magneto-optical disc (MO), a compact disc read-only memory (CD-ROM), a compact disc recordable (CD-R), a compact disc rewritable (CD-RW), a magnetic tape, a non-volatile memory card, a ROM, and a digital versatile disc (DVD) (DVD-ROM and digital versatile disc recordable (DVD-R)).

The program can be supplied to a user by connecting to an Internet website using a browser of a client computer and downloading the computer-executable program of the present invention or a compressed file including an automated installation function into a recording medium, such as a hard disk.

Further, the program code that configures the program of the exemplary embodiments of the present invention can be divided into a plurality of files and each file can be downloaded from different Internet websites. In other words, a World Wide Web (WWW) server which allows a plurality of users to download a program file to realize the functions of the above-described exemplary embodiments also configures the present invention.

Furthermore, the program of the present invention can be encrypted, recorded on a recording medium, such as a CD-ROM, and delivered to users. In this case, a user who satisfies a predetermined condition is allowed to download decryption key information from an Internet website via the Internet, to decrypt the encrypted program using the decryption key information, and installs the decrypted program on the computer.

The functions of the above-described exemplary embodiments are implemented when the provided program is executed by a computer. Additionally, an OS running on a computer can realize the functions of the above-described exemplary embodiments by performing the entire or a part of the actual processing based on an instruction from the program.

Furthermore, the program read out from the recording medium is written in a memory in a function expanding board inserted in a computer or a function expanding unit connected to a computer and a CPU provided in the function expanding board or the function expanding unit performs the whole or a part of the actual processing based on an instruction from the program to realize the functions of the above-described exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2007-224276 filed Aug. 30, 2007 and No. 2008-149806 filed Jun. 6, 2008, which are hereby incorporated by reference herein in its entirety.

What is claimed is:

1. A reproducing apparatus configured to reproduce moving image data based on management information including time information and position information about a plurality of intra pictures in the moving image data and display the reproduced moving image data on a display, the reproducing apparatus comprising:
a determination unit configured to acquire information about a time interval and a position interval between two intra pictures from the time information and the position information and determine a bit rate between the two intra pictures, based on the acquired information; and
a processing unit configured to calculate a maximum bit rate from among a plurality of bit rates between two intra pictures determined by the determination unit and store the calculated bit rate as a maximum bit rate of a stream of the moving image data; and
a display control unit configured to display information of the maximum bit rate corresponding to the stream of the moving image data, on the display.

2. The reproducing apparatus according to claim 1, wherein the display control unit displays the information of the maximum bit rate together with a reproduced image of the stream of the moving image data, on the display.

3. The reproducing apparatus according to claim 1, wherein the display control unit displays recording mode information corresponding to the maximum bit rate, on the display.

4. The reproducing apparatus according to claim 1, wherein the display control unit displays at least one of XP mode, SP mode and LP mode as the information corresponding to the maximum bit rate, on the display.

5. The reproducing apparatus according to claim 1, further comprising:
a detection unit configured to detect whether bit rate information or recording mode information is multiplexed on the moving image data,
wherein if the bit rate information or the recording mode information is multiplexed according to a result of a detection by the detection unit, the display control unit displays an index display including the multiplexed bit rate information or the multiplexed recording mode information as the display information, on the display.

6. The reproducing apparatus according to claim 5, wherein the display control unit changes a display manner between when the multiplexed bit rate information or the multiplexed recording mode information is displayed and when the maximum bit rate stored by the processing unit or the recording mode information corresponding to the maximum bit rate stored by the processing unit is displayed.

7. The reproducing apparatus according to claim 1, further comprising a generation unit configured to generate a representative image data representing the moving image data, wherein the display control unit displays the information of the maximum bit rate corresponding to the stream of the moving image data on an index display, which is formed using the representative image data generated by the generation unit.

8. A method for controlling a reproducing apparatus configured to reproduce moving image data based on management information including time information and position information about a plurality of intra pictures in the moving image data and display the reproduced moving image data on a display, the method comprising:
acquiring information about a time interval and a position interval between two intra pictures from the time information and the position information;
determining a bit rate between the two intra pictures, based on the acquired information;
calculating a maximum bit rate from among a plurality of bit rates between two intra pictures determined and storing the calculated bit rate as a maximum bit rate of a stream of the moving image data; and
displaying information of the maximum bit rate corresponding to the stream of the moving image data on the display.

9. The method according to claim 8 further comprising displaying the information of the maximum bit rate together with a reproduced image of the stream of the moving image data on the display.

10. The method according to claim 8, further comprising:
displaying recording mode information corresponding to the maximum bit rate on the display.

11. The method according to claim 8, further comprising:
displaying at least one of XP mode, SP mode and LP mode as the information corresponding to the maximum bit rate on the display.

12. The method according to claim 8, further comprising:
detecting whether bit rate information or recording mode information is multiplexed on the moving image data; and
displaying an index display including the multiplexed bit rate information or the multiplexed recording mode information as the display information on the display if the bit rate information or the recording mode information is detected as multiplexed.

13. The method according to claim 12, further comprising changing a display manner between when the multiplexed bit rate information or the multiplexed recording mode information is displayed and when the maximum bit rate stored or the recording mode information corresponding to the maximum bit rate stored is displayed.

14. The method according to claim 8, further comprising:
generating representative image data representing the moving image data; and
displaying the information of the maximum bit rate corresponding to the stream of the moving image data on an index display which is formed using the generated representative image data.

15. A non-transitory storage medium configured to store a computer-executable program for a method for controlling a reproducing apparatus configured to reproduce moving image data based on management information including time information and position information about a plurality of intra pictures in the moving image data and display the reproduced moving image data on a display, the method comprising:
acquiring information about a time interval and a position interval between two intra pictures from the time information and the position information;
determining a bit rate between the two intra pictures, based on the acquired information;
calculating a maximum bit rate from among a plurality of bit rates between two intra pictures determined and storing the calculated bit rate as a maximum bit rate of a stream of the moving image data; and
displaying information of the maximum bit rate corresponding to the stream of the moving image data on the display.

16. A reproducing apparatus configured to reproduce moving image data and display the reproduced moving image data on a display, the reproducing apparatus comprising:
a reading unit configured to read bit rate information or recording mode information concerning the moving image data from management information of the moving image data if an apparatus which generates the moving image data and the reproducing apparatus is a same apparatus; and
a display control unit configured to display the bit rate information or the recording mode information concerning the moving image data in a different display manner between when the apparatus that generates the moving image data and the reproducing apparatus are the same apparatus and when the apparatus that generates the moving image data and the reproducing apparatus are not the same apparatus,
wherein, when the apparatus that generates the moving image data and the reproducing apparatus are not the same apparatus, the display control unit displays a maximum bit rate calculated from among a plurality of bit rates between two intra pictures in the moving image data, each of the plurality of bit rates determined based on a time interval and position interval between two intra pictures.

* * * * *